United States Patent [19]

Jha et al.

[11] Patent Number: 5,447,698

[45] Date of Patent: Sep. 5, 1995

[54] CATALYTIC CONVERTERS—METAL FOIL MATERIAL FOR USE THEREIN, AND A METHOD OF MAKING THE MATERIAL

[75] Inventors: Sunil C. Jha, North Attleboro, Mass.; James A. Forster, Barrington, R.I.

[73] Assignee: Texas Instruments Incorporated, Dallas, Tex.

[21] Appl. No.: 286,719

[22] Filed: Aug. 5, 1994

Related U.S. Application Data

[62] Division of Ser. No. 111,384, Aug. 24, 1993, Pat. No. 5,366,139.

[51] Int. Cl.$^6$ .................. B01J 32/00; B01J 35/04; B23K 20/04
[52] U.S. Cl. .................. 422/180; 422/177; 502/439; 502/527; 29/890; 228/193; 228/235.2; 228/262.44; 148/531; 148/535; 428/941; 428/606
[58] Field of Search .......... 422/177, 180; 502/439, 502/527; 428/606–607, 472.2, 941; 148/531, 535; 228/262.44, 193, 205, 235.2, 220, 175

[56] References Cited

U.S. PATENT DOCUMENTS

| | | | |
|---|---|---|---|
| 2,028,917 | 4/1936 | Wilson et al. | 29/17.2 |
| 2,753,623 | 7/1956 | Boessenkool | 29/497.5 |
| 3,214,820 | 11/1965 | Smith et al. | 29/18 |
| 3,387,357 | 6/1968 | Sendzimir | 29/494 |
| 3,648,353 | 3/1972 | Anderson | 29/470.1 |
| 3,907,611 | 9/1975 | Sasame et al. | 148/6.3 |
| 3,912,152 | 10/1975 | Forand | 228/190 |
| 3,941,569 | 3/1976 | Sasame et al. | 29/183.5 |
| 4,079,157 | 3/1978 | Yagi et al. | 427/380 |
| 4,228,203 | 10/1980 | Yagi et al. | 427/229 |
| 4,619,912 | 10/1986 | Jalbing et al. | 502/439 |
| 4,753,918 | 6/1988 | Cyron et al. | 502/439 |
| 4,753,919 | 6/1988 | Whittenberger | 502/439 |
| 4,859,649 | 8/1989 | Bohnke et al. | 502/439 |
| 5,110,690 | 5/1992 | Usui et al. | 428/678 |

FOREIGN PATENT DOCUMENTS

0475420A1  3/1992  European Pat. Off. ...... C22C 38/34

*Primary Examiner*—Robert J. Warden
*Assistant Examiner*—Hien Tran

[57] ABSTRACT

A metal foil substrate material for catalytic converters and method of making the material in which layers of ferritic stainless steel and aluminum are solid state metallurgically bonded together forming a composite material. Such composite material is further rolled to the final foil gauge with no heat treatment and then subjected to a thermal in situ reaction to form a resulting uniform solid solution foil material with superior high temperature corrosion resistance.

4 Claims, 2 Drawing Sheets

CATALYTIC CONVERTERS—METAL FOIL MATERIAL FOR USE THEREIN, AND A METHOD OF MAKING THE MATERIAL

This application is a division, of application Ser. No. 08/111,384, now U.S. Pat. No. 5,366,139, filed Aug. 24, 1993.

BACKGROUND OF THE INVENTION

This invention relates to a composite material having corrosion resistance at high temperatures and method of manufacture and, more particularly, to the material and method for producing a metal foil material for use in catalytic converters.

As well known, exhaust gases discharged from motor vehicles may contain halogen gases, halogen compounds and lead compounds, for example, $Cl_2$, $Br_2$, $PbCl_2$, $C_2H_2Cl_2$, $C_2H_2Br_2$ etc., besides unburnt noxious gases including carbon monoxide, hydrocarbon and the like, and components or parts made of ferrous base alloy material for exhaust system of the motor vehicles or the like, for example, heat exchangers, air ducts, containers, etc., tend to be subjected to corrosion by the noxious compounds as described above. Moreover, halogen compounds (e.g. salt) employed for preventing freezing during cold seasons are liable to enter these components of ferrous base alloy material, which are then corroded by the atmosphere containing halogen gas produced when the halogen compounds are decomposed at high temperatures.

It has been known to use metal foil materials as substrates with an appropriate catalyst coating in place of ceramic material substrates. Such metal foil material has been made from steel sheets containing aluminum and also chromium in order to have the desired corrosion resistance at high temperature. These FeCrAl alloys, however, are difficult to produce by conventional rolling and annealing processes. To overcome the processing difficulties, it has been suggested, as in EP application 91115501.8, to produce the foil by a rapid solidification processing method; but such processing is expensive and requires very precise controls. It has also been suggested to dip the stainless steel in a molten bath of aluminum or aluminum alloy to apply melt-plating on the surface of the stainless steel (U.S. Pat. Nos. 3,907,611, 3,394,659 and 4,079,157). This stainless steel with the aluminum is then subjected to a heat treatment to form an alloy layer having Fe and Al as the main components. Still further, surface layers of aluminum in binder materials, as described in U.S. Pat. No. 4,228,203, have also been suggested. However, in all of these applications the control of the processing parameters is complex and expensive; and the final foil has not proven, in many cases, to have the desired corrosion-/oxidation resistance at elevated temperatures.

BRIEF SUMMARY OF THE INVENTION

Accordingly, the present invention provides for a composite metal foil material and method of manufacture typically for catalytic converters having corrosion resistance at high temperatures and resistance against oxidation in an exhaust gas atmosphere. Further, the composite material is easily and economically manufactured for high volume applications.

Briefly described, in accordance with the invention, a metal foil material is made by producing a three layer material with the two outside layers being essentially identical and chosen from the group consisting of stainless steel materials and aluminum materials; and the central layer being made from the material not chosen for the outside layers, as for example, a central layer of stainless steel sandwiched between two thinner outer layers of aluminum or aluminum alloys. The three layer materials, having a relatively thin starting thickness, are pressure rolled together to further reduce the thickness of the layer materials, to metallurgically bond the layer materials to each other to form a composite multilayer metal material having a thickness such that the composite material can be pressure rolled to the final foil thickness without the necessity of any heat treatment operations. Such composite is pressure rolled to this final foil thickness, and then is diffusion heat treated at a temperature between 900° C. and 1200° C. for a period of time to cause diffusion of the various constituents in the layers of the composite material throughout the foil. The composite forms a material, with the complete presence of the constituents of the aluminum layer and the stainless steel layers dispersed throughout the total foil material thereby providing for the superior corrosion/oxidation resistance at high temperatures. The chosen composition and thickness of these starting materials will provide for a foil material with a known furnished composition. The fact that no heating of the composite material is needed prior to reaching the final foil thickness, greatly increases the ability to manufacture the material with acceptable material yields in long continuous lengths.

BRIEF DESCRIPTION OF THE DRAWINGS

Other objects, advantages and details of the novel material and method of manufacture of this invention appear in the detailed description of the preferred embodiments of the invention, the detailed description referring to the drawings in which.

DESCRIPTION OF THE PREFERRED EMBODIMENTS

Figure 1:
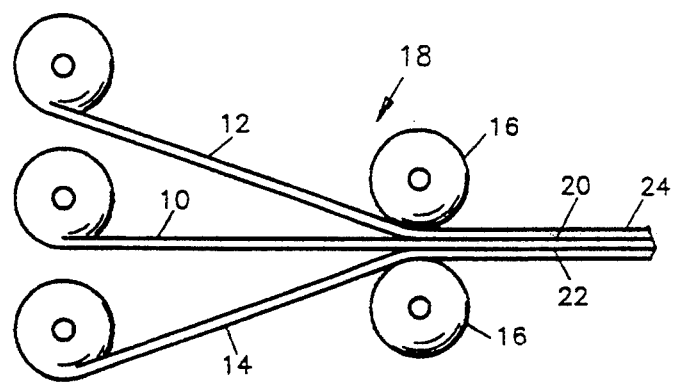
FIG. 1 shows a side elevation view diagrammatically illustrating the bonding method of this invention.
Figure 2:
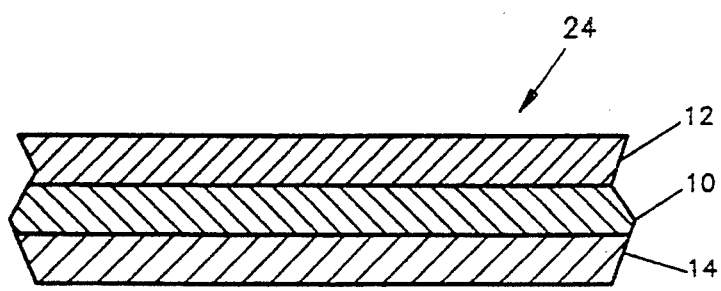
FIG. 2 shows the composite material of this invention after bonding.

In accordance with the novel and improved method and material of this invention, a first central layer 10 of ferrous material is sandwiched between two outer layers 12 and 14 of aluminum or aluminum alloy material. The three layers are passed between a pair of pressure rolls 16 in a convention rolling mill 18. The layers are squeezed together with sufficient force to be reduced in thickness, and metallurgically bonded together along interfaces 20 and 22 between the metal layers to form a composite multilayer metal material 24 as shown in FIG. 2. The material is then continuously rolled to the finished desired foil thickness and thermally reacted into a foil sheet 50 as will be explained in detail below.

Typically, the first central layer 10 comprises a ferritic stainless steel with 16 to 24 wt. percent Cr, and the balance Fe with the S content less than 0.003 wt. percent. Examples of such ferritic stainless steels are 430, 434 and 446 stainless steels with controlled sulfur content. Preferably, top and bottom layers 12 and 14 are of the same thickness and material, and are comprised of essentially pure aluminum although aluminum alloys could also be used.

It is to be understood that the invention could equally well be practiced with a central relatively thinner layer of aluminum or aluminum alloys, and top and bottom layer of the ferritic stainless steel material.

Figure 3:
FIG. 3 diagrammatically shows the material of this invention after diffusion heat treatment.

In a preferred embodiment having excellent high temperature oxygen corrosion resistance, it has been found desirable to have a final chemistry in the final material 50 after thermal reaction (to be explained in detail below) of between 18 to 20 wt. percent Cr, at least 5 wt. percent Al and the balance Fe. Additionally, small amounts of rare earth metals such as Ce, Y, Er, etc., can be added to either of the metals forming the composite to also increase high temperature corrosion resistance. An example of such an embodiment is where a layer of 434 stainless steel, having a thickness typically of between 0.045 and 0.070 of an inch, is bonded to essentially pure aluminum top and bottom layers having a thickness typically of between 0.004 and 0.007 of an inch thereby yielding a bonded composite of approximately 0.015 to 0.025 of an inch as shown in FIG. 3. One typical example results in a composite of about 84 percent stainless steel and a top and bottom layer of aluminum of about 8 percent each. The initial starting thicknesses of the layers have been chosen to determine two important material characteristics of the final composite. The first is to determine the ultimate chemistry of the final composite after thermal reaction, and the second is to provide a bonded composite which is capable of being reasonably continuously rolled to the final desired gauge after bonding without the need of any thermal treatment which could cause the formation of intermetallics of the metal constituents. This second item is particularly important in being able to produce the material economically in large production quantities.

Accordingly, the composite 24 is cold rolled by Conventional means from the bonding gauge to the final foil thickness typically of about 0.002 of an inch. This finish rolled foil is then thermally reacted or heat treated at a temperature between 900° C. and 1200° C., and preferably about or above 1100° C. for between 1 minute and 60 minutes or longer to provide for diffusion of the various constituents in the composite throughout the foil material. That is, after this heating operation, the microstructure of the foil will not be a three layer structure; but instead a uniform solid solution alloy. The heating can be done in a vacuum, reducing atmosphere or air. The desirability of heating above 1100° C. is the fact that such heating eliminates the formation of undesirable Kirkendall voids, and ensures that all iron aluminide intermetallics are dissolved. The occurrence of Kirkendall voids is also minimized by keeping the sulfur content of the composite, and specifically the stainless steel component, to extremely low levels (preferably less than 0.003 wt. percent). These Kirkendall voids can cause premature failure of the foil in fatigue loading which easily can result when such foil is used as a catalytic converter substrate.

The oxidation resistance of the foil material of the present invention is further enhanced by the formation of a thin layer of an aluminum oxide whisker network on the metal surface typically done in an additional heating operation at a temperature between 900° C. and 1100° C. in air although it may be done as part of the diffusion heating step. The oxide layer prevents the metal from further oxidation. During thermal cycling when used as a catalytic converter substrate foil material, the oxide layer tends to crack and separate from the base material directly below the surface which results in this material further oxidizing. To reduce the separation of the surface oxide layer from the base material below and to increase adhesion, a small amount of rare earth elements (between 0.01 and 0.10 wt. percent) is preferably added to the foil material. In the present invention, this rare earth metal addition can be made by the addition of such metal(s) in either the starting aluminum or ferrous materials. These rare earth metal element additions, combined with extremely low sulfur content, further minimize any Kirkendall voids.

In order to give greater appreciation of the advantages of the invention, the following examples are given:

EXAMPLE I

A continuous strip of completely annealed 434 stainless steel having a thickness of 0.060 of an inch was cleaned and brushed. This strip was sandwiched between two continuous strips of cleaned aluminum foil of 0.006 of an inch each and roll bonded in a single operation to yield a solid state metallurgically bonded three layer composite of 0.020 of an inch as described in U.S. Pat. No. 2,753,623 which is incorporated herein by reference. This composite material continuous strip was cold rolled on a conventional rolling mill in multiple passes until the final desired gauge of 0.002 inches was achieved. This foil material was then heated to 1100° C. in vacuum for 60 minutes to diffuse all the aluminum into the stainless steel base, thereby forming a complete uniform solid solution foil material. This foil material showed approximate chemical composition of 75 wt. percent Fe, 20 wt. percent Cr, and 5 wt. percent Al. These metal materials listed above were of uniform concentration throughout the foil.

EXAMPLE II

This example was carried out identical to Example I above except the starting center strip used was pure aluminum having a thickness of 0.012 of an inch and the top and bottom strip layers were of 434 stainless steel each having a thickness of 0.030 of an inch. The finished foil material after heat treatment had the same uniform solid solution chemical composition as set forth in Example I above.

EXAMPLE III

This example was carried out identical to Example I above except the 434 stainless steel was replaced by a stainless steel of the following composition: 20 wt. percent Cr, 0.015 wt. percent Ce, 0.004 wt. percent La, 0.009 wt. percent Ni, 0.002 wt. percent S and the balance Fe with the unavoidable impurities of Mn, and Si. This finish foil material after heat treatment had a uniform solid solution chemical composition approximately of 73.3 wt. percent Fe, 18.2 wt. percent Cr and 6.7 wt. percent Al for the major constituents with S and rare earth metals in the desired range.

EXAMPLE IV

This example was carried out identical to Example III above except the furnished foil material was further heat treated in air at 960° C. for 20 hours to produce the alumina whisker network, Such alumina whisker network is desirable for applying ceramic wash coat on the foil substrate as commonly practiced for catalytic converter manufacture.

Figure 4:
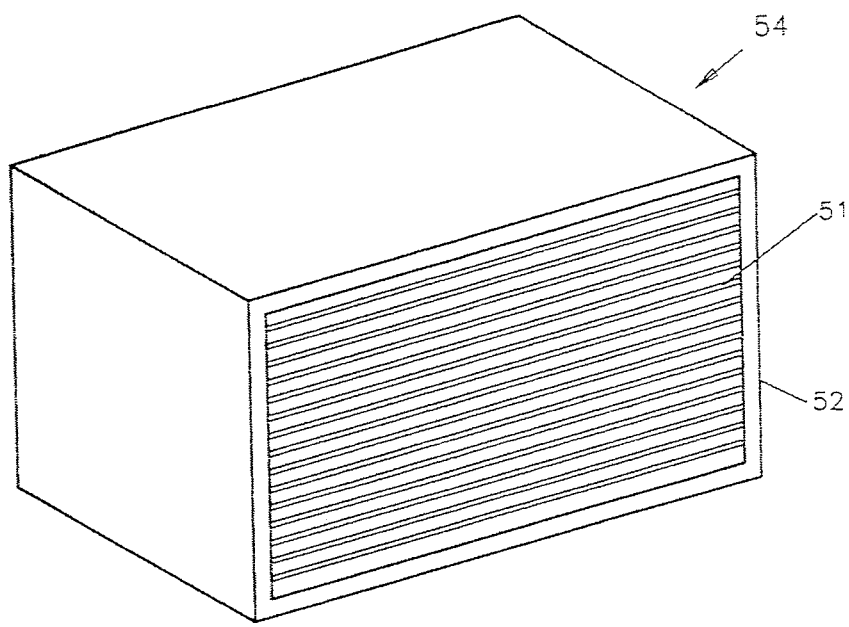
FIG. 4 shows the material used in a catalytic converter.
Figure 5:
FIG. 5 shows a photomicrograph of the material of FIG. 3.

Accordingly, the foil for use as a substrate in catalytic converters provided by the process of this invention is typically provided with an alumina whisker network on the surface of the foil. This alumina whisker network (not shown) has a ceramic wash coat, as is known in the art, applied on the foil substrate (not shown), and such catalyst sheet 51 (with whisker network and wash coat) is positioned on a frame 52 to form a catalytic converter unit 54 as shown in FIG. 4.

The novel process and article produced by method of the present invention provides for a foil material for use in catalytic converters with good corrosion resistance at elevated temperatures. The material is easily and economically manufactured having a selectively predetermined desired chemical composition. The chemical composition is uniform throughout the foil sheet. While the invention has been described in combination with the specific embodiments thereof, it is evident that many alternatives, modification and variations will be apparent to those skilled in the art in light of a foregoing description.

We claim:

1. A foil substrate material having various metal constituents for catalytic converters made by the process of providing a layer of a first material chosen from the group consisting of chromium containing ferrous metals and aluminum and aluminum alloys, sandwiching said layer of first material between first and second layers of a second material chosen from the group consisting of chromium containing ferrous metals and aluminum and aluminum alloys not chosen for the first material, metallurgically bonding said layers together by reducing the thickness of said layers thereby forming a multilayer composite material of said first and second materials, reducing the thickness of the composite material to a final thickness and heating said material composite in situ at a temperature between 900° C. and 1200° C. for a sufficient period of time to cause diffusion of the various metal constituents of said layers throughout the composite material thereby providing a uniform solid solution material for the foil substrate.

2. The foil substrate material according to claim 1 wherein said uniform solid solution material is further heat treated in air at a temperature between 900° C. and 1100° C. for sufficient time to form a thin surface layer of an aluminum oxide whisker network on the surface of the uniform solid solution material.

3. The foil substrate material according to claim 2 in which a ceramic wash coat is applied to the surface of said aluminum oxide whisker network.

4. A catalytic converter comprising a frame with a plurality of layers of foil substrate material of claim 3.

* * * * *